INVENTOR.
ANDREW G. F. DINGWALL
BY
W. S. Hill
AGENT

Sept. 19, 1967 A. G. F. DINGWALL 3,342,567
LOW RESISTANCE BONDS TO GERMANIUM-SILICON BODIES
AND METHOD OF MAKING SUCH BONDS
Filed Dec. 27, 1963 2 Sheets-Sheet 2

INVENTOR.
ANDREW G.F. DINGWALL
BY
W.S. Hill
AGENT

United States Patent Office 3,342,567
Patented Sept. 19, 1967

3,342,567

LOW RESISTANCE BONDS TO GERMANIUM-SILICON BODIES AND METHOD OF MAKING SUCH BONDS

Andrew G. F. Dingwall, Bloomfield, N.J., assignor to Radio Corporation of America, a corporation of Delaware Filed Dec. 27, 1963, Ser. No. 333,895
20 Claims. (Cl. 29—195)

ABSTRACT OF THE DISCLOSURE

A tungsten body and a silicon-germanium alloy body are bonded together by providing a tungsten carbide layer on the tungsten body, engaging the tungsten carbide layer on the tungsten body with the silicon-germanium alloy body, and heating the assemblage in a non-oxidizing ambient while applying pressure between the two bodies. The resulting joint between the two bodies comprises compounds of silicon carbide and tungsten silicides.

This invention relates to improved methods and materials for fabricating mechanically strong, low electrical resistance contacts to germanium-silicon alloy bodies, and to improved thermoelectric devices utilizing germanium-silicon alloy bodies with low resistance contacts.

Germanium-silicon alloys have been utilized for infrared detector devices, for example, as described in U.S. Patent 2,953,529, issued Sept. 20, 1960 to M. L. Schultz and assigned to the assignee of the instant application; for semiconductor devices, for example, as described in U.S. Patent 2,817,798, issued Dec. 24, 1957 to D. A. Jenny and assigned to the assignee of the instant application; and for thermoelectric devices capable of converting thermal energy into electrical energy, as described in many publications. In these and other devices, it is frequently necessary to make mechanically strong but low electrical resistance contacts to the germanium-silicon alloy bodies. Tungsten has a relatively low thermal expansion coefficient and makes a good electrical contact, and for these reasons has previously been considered for making good, stable, low resistance bonds to bodies made of germanium-silicon alloys.

It is an object of the instant invention to provide improved methods and materials for making low resistance electrical contacts to germanium-silicon alloy bodies.

Another object of the invention is to provide improved methods and materials for obtaining thermally stable, mechanically strong contacts to thermoelements composed of germanium-silicon alloys.

Still another object of the invention is to provide germanium-silicon bodies with improved contacts having about the same thermal coefficient of expansion as the bodies.

A further object of the invention is to provide improved methods for obtaining low resistance, mechanically strong bonds between tungsten bodies and germanium-silicon alloy bodies.

Yet another object of the invention is to provide a thermostable low resistance electrical connection between a tungsten body and a thermoelectric component which consists of germanium-silicon alloys.

But another object is to provide improved thermoelectric devices utilizing germanium-silicon alloys with thermostable contacts as the thermoelements.

An unexpectedly improved bond between a germanium-silicon alloy body and a tungsten body may be made by a novel method comprising first forming a tungsten carbide layer on at least one face of a tungsten body, then contacting a body of germanium-silicon alloy to the tungsten carbide layer of said tungsten body, and heating the assemblage in a non-oxidizing ambient while applying pressure between the two bodies. The bond thus formed between the germanium-silicon alloy body and the tungsten body is easily fabricated; mechanically strong; thermally stable; inexpensive to make; and exhibits a surprisingly low electrical resistance.

The invention and its advantages and features will be described in greater detail by the following examples, considered in conjunction with the accompanying drawing, in which.

*Example I*

Figure 1:
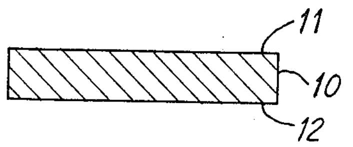
FIGURES 1–5 are cross-sectional views illustrating successive steps in the bonding of a germanium-silicon alloy body to a tungsten body according to one embodiment of the invention.

A tungsten body 10 (FIGURE 1) is prepared in the desired form and size, the exact shape and dimensions of the tungsten body not being critical. Conveniently, the tungsten body 10 has two opposing major faces 11 and 12. In this example, the tungsten body 10 is in the form of a disc having a diameter of about 0.5 inch, and a thickness of about .02 to .04 inch.

Figure 2:
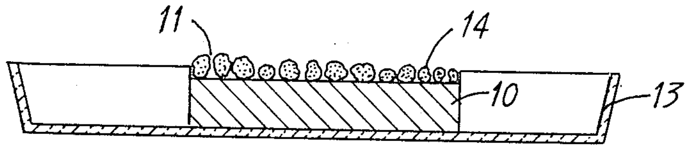

A tungsten carbide layer is formed on one major face of tungsten body 10 by a suitable technique. In this example, the tungsten body 10 is positioned in a refractory furnace boat 13 (FIGURE 2) with one major face 11 upward. The furnace boat 13 is suitably made of graphite, or of a refractory metal such as molybdenum. The one major face 11 of tungsten body 10 is covered with a layer 14 of carbon granules. Activated charcoal is particularly suitable for this purpose, but other forms of carbon, including lampblack, may be utilized.

Figure 3:
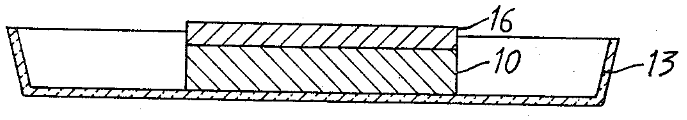

Furnace boat 13 is then positioned in a furnace (not shown) and heated in a reducing ambient, i.e., a hydrogen-containing ambient, for a time and temperature sufficient to form a tungsten carbide layer 16 (FIGURE 3) on the one major face 11 of tungsten body 10. Suitably, the temperature range for this step is about 1600° C. to 1900° C., and the heating time is about 10 to 60 minutes. The reducing ambient may be either pure dry hydrogen, or mixtures of hydrogen with an inert gas such as nitrogen, helium, argon and the like. The tungsten carbide layer 16 thus formed is suitably about 0.5 to 5.0 mils thick. In this example, the carbon-covered tungsten body is heated in an ambient of pure dry hydrogen for about 40 minutes at about 1750° C. Under these conditions, the tungsten carbide layer 16 formed on face 11 of tungsten body 10 is about 1 to 2 mils thick.

Part of the carbon remains unreacted with the tungsten. Some of this unreacted carbon is still in the form of granules 14 and these are easily removed after cooling the tungsten body 10 to room temperature, for example, by brushing them off. The remainder of the unreacted carbon, in a finer state of subdivision, is more intimately mixed into the tungsten carbide layer 16, causing it to vary in color from a light gray to black, depending on the amount of residual carbon present in the tungsten carbide layer 16. It has been found advantageous to remove this residual carbon present in the tungsten carbide layer 16 by placing the furnace boat 13 and tungsten body 10 in a vacuum furnace (not shown) and firing the tungsten body for a time and at a temperature sufficient to remove the residual carbon. It is thought that the residual carbon is removed by completely reacting with the tungsten to form tungsten carbide. The residual pressure in the vacuum furnace should be not greater than $1\times10^{-3}$ torr, and is preferably about $1\times10^{-5}$ torr. Firing the tungsten body in such a vacuum for about 10 to 60 minutes at about 1600° to 1900° C. is sufficient to remove most of the residual carbon from the tungsten carbide layer 16. As a result of this treatment, the tungsten carbide layer 16, which previously may have been quite dark, becomes a light gray in color. While this step of removing residual carbon is advantageous, and improves the quality of the bond subsequently formed, it is not essential. Mechanically strong bonds may be fabricated without utilizing this step.

Figure 4:
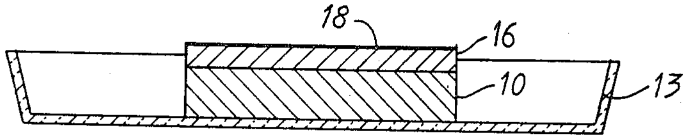

It has also been found advantageous to deposit a thin film 18 (FIGURE 4) of finely divided silicon on the tungsten carbide layer 16. This may conveniently be accomplished by painting the tungsten carbide layer 16 with a suspension consisting of finely divided silicon suspended in an organic vehicle. Intrinsic silicon (pure silicon free from conductivity modifiers, and hence neither P-type nor N-type) may be utilized for this purpose, and will make a satisfactory bond to germanium-silicon bodies of any conductivity type, including intrinsic germanium-silicon bodies. Advantageously, when the germanium-silicon body is extrinsic, that is, is either P-type or N-type, the silicon is doped with either an acceptor such as boron, aluminum, gallium, and indium, or with a donor such as phosphorus, arsenic, and antimony, so as to be of the same conductivity type as the germanium-silicon body which is to be bonded to the tungsten body 10. Suitably, a P-type silicon alloy for this purpose may consist of about 99 weight percent silicon and 1 weight percent boron. A suitable N-type silicon alloy may consist of about 99 weight percent silicon and 1 weight percent phosphorus. The doped silicon is ball milled until the average particle size is about 1 to 20 microns in diameter. The organic vehicle may, for example, be a solvent such as acetone, butyl acetate, ethyl alcohol, isopropyl alcohol, and the like. The suspension may be made by ball milling about 10 to 70 grams of the previously prepared finely divided doped silicon in about 100 ml. of the organic vehicle. After the silicon film 18 has been deposited on tungsten carbide layer 16 by this or in any other convenient manner, the tungsten body 10 is again fired in vacuum at a temperature of about 1500° to 1750° C. for a period of about 10 minutes to 60 minutes. As a result of this step, at least some of the silicon left on the surface of the tungsten carbide reacts with the tungsten carbide to form a mixture of compounds, which are presently believed to consist of silicon carbide and tungsten silicide. Although the step of reacting the silicon particles with the tungsten carbide is beneficial, and improves the quality of the bond subsequently formed, good bonds may be fabricated without utilizing this step.

Figure 5:
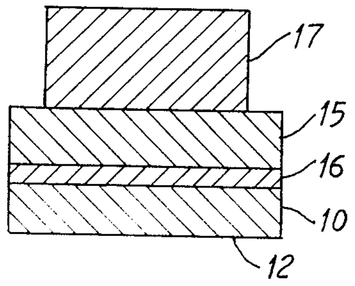

The germanium-silicon body 15 (FIGURE 5) which is to be bonded to the tungsten body 10 is positioned on the tungsten carbide layer 16 of the tungsten body. The germanium-silicon body 15 may be either polycrystalline or monocrystalline. The exact composition of the germanium-silicon alloy is not critical, and may vary from 1 to 50 atomic percent germanium, balance silicon. The germanium-silicon body 15 may be either intrinsic or extrinsic, N-type or P-type, lightly doped or heavily doped. The exact size and shape of germanium-silicon body 15 is not critical. In this example, germanium-silicon body 15 is a disc about 0.5 inch in diameter and 0.25 inch thick. Preferably the mating surfaces of the two bodies are flat.

Pressure is then applied between the germanium-silicon body 15 and the tungsten body 10 by any convenient method. Various types of clamps or jigs may be utilized for this purpose. The pressure applied should be preferably not less than one pound per square inch of the mating area between the two bodies. The upper limit of the pressure applied is that pressure which would crack the germanium-silicon body 15. Very high pressures are not required. Moderate pressure in the range of between about 1 to 200 pounds per square inch on the mating surface between the two bodies has been found satisfactory in practice and is recommended. In this example, the necessary pressure is applied in a convenient and simple manner by placing a weight 17 on the germanium-silicon body 15. Since the area of the mating surface between bodies 10 and 15 is about $\frac{3}{16}$ square inch in this example, a one-half pound weight is sufficient to apply a pressure of between two and three pounds per square inch to the mating surface between tungsten body 10 and germanium-silicon body 15. A suitable material for the weight 17 is stainless steel, since this material neither directly affects, nor is affected by the germanium-silicon body 15 during the subsequent heating step.

The assemblage of tungsten body 10, germanium-silicon body 15 and weight 17 is then heated in a non-oxidizing ambient to a temperature of about 1100° to 1250° C. Heating the assemblage for about 1 to 60 minutes in this temperature range has been found satisfactory, depending on the temperature employed. If heating is performed at a high temperature, close to the solidus of the silicon-germanium alloy system, a heating time of about one minute is sufficient. Lower heating temperatures require longer heating times. The non-oxidizing ambient utilized may consist of a reducing gas, such as hydrogen, or forming gas (one volume hydrogen and nine volumes nitrogen), or may be an inert gas such as nitrogen, helium, argon, and the like. Non-oxidizing ambients are utilized in order to prevent any undesirable side reactions such as oxidation of the germanium-silicon body 15. Such side reactions can also be prevented by performing the heating step in a vacuum furnace at residual atmospheric pressures of less than about $1\times10^{-3}$ torr, since the amount of oxygen remaining in the furnace atmosphere at this reduced pressure is insufficient to injure the germanium-silicon body 15 by oxidation or other undesirable side reactions. A vacuum may thus be regarded as a non-oxidizing ambient. In this example, the assemblage of tungsten body 10, germanium-silicon body 15, and weight 17 is heated in a vacuum furnace (not shown) at about 1200° C. for about 2 minutes at a residual atmospheric pressure of about $1\times10^{-5}$ torr. The assemblage is then cooled to room temperature in the particular non-oxidizing ambient employed, and removed from the furnace.

Figure 6:
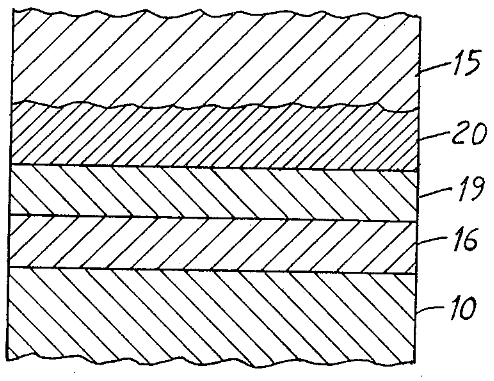
FIGURE 6 is a cross-sectional enlarged view of the bond formed between a germanium-silicon body and a tungsten body in acordance with the invention.

It has been found that the bond thus formed between tungsten block or body 10 and germanium-silicon body 15 has great mechanical strength, low electrical resistance, low thermal resistance, and remains stable at high temperatures, for example, even after prolonged heating in vacuum at temperatures as high as 800° C. The exact nature of the bond or joint between the two bodies is not certain, but microscopic examination of a cross-section of the bonded area shows multiple layers, including a thin layer or zone 19 (FIGURE 6) of a new substance or phase which has formed in the contact area between the tungsten carbide layer 16 on the tungsten body 10, and a germanium-rich zone 20 of the germanium-silicon body 15 immediately adjacent the contact area. The layer 19 is presently believed to consist of a mixture of silicon carbide and tungsten silicide. It will be understood that the enlarged view of the bond in FIGURE 6 is schematic and not to scale, the thickness of the various layers being exaggerated for greater clarity.

*Example II*

If desired, tungsten blocks or bodies may be bonded to opposite ends or faces of a germanium-silicon body, thus making a plurality of low-resistance contacts to the germanium-silicon body, as described below.

Figure 7:
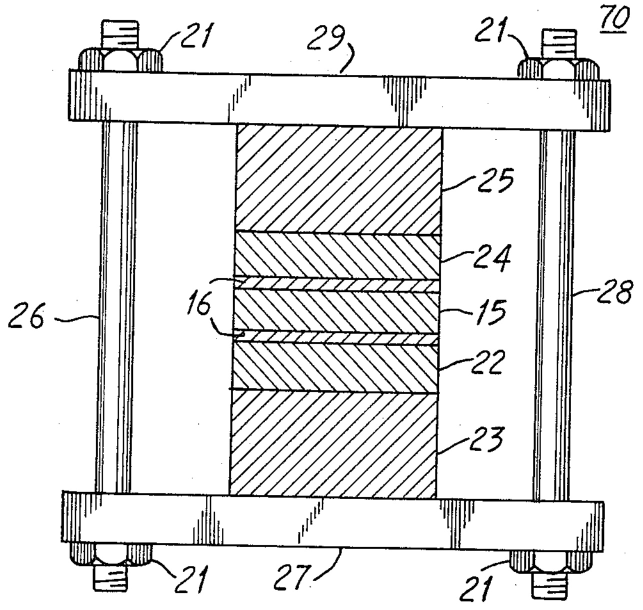
FIGURE 7 is a cross-sectional view of a germanium-silicon body in process of being provided with a mechanically strong, low-resistance contact on each of two opposing faces according to another embodiment of the invention; and, FIGURE 8 is a cross-sectional view of a thermoelectric Seebeck device according to another embodiment of the invention.

In this example, the germanium-silicon body 10 (FIGURE 7) is disc shaped, polycrystalline, of P-type conductivity, and consists of 50 atomic percent germanium-50 atomic percent silicon. The germanium-silicon body 10 is sandwiched between two tungsten bodies 22 and 24. Conveniently, tungsten bodies 22 and 24 are discs of the same thickness and diameter as the germanium-silicon body 20. The tungsten bodies 22 and 24 have been treated as described in Example I to form a tungsten carbide layer 16 on one major face of each body. The tungsten bodies 22 and 24 are positioned so that the tungsten carbide layer 16 of each body is in contact with the germanium-silicon body 10.

The tungsten-semiconductor-tungsten sandwich thus assembled is placed in a suitable clamp or press 70. While more elaborate jigs may be utilized, if available, the simple differential expansion clamp 70, illustrated in FIGURE 7, has been found satisfactory. This expansion clamp 70 comprises two thermal expansion compound members 23 and 25, which press against tungsten bodies 22 and 24 respectively. The two expansion members 23 and 25 are urged toward each other by steel cross bars 27 and 29 respectively. Cross bars 27 and 29 are held together by a pair of bolts 26 and 28. A nut 21 at each end of bolts 26 and 28 is used to adjust the pressure exerted between thermal expansion members 23 and 25 against the tungsten-semiconductor-tungsten sandwich. Stainless steel is preferred for the thermal expansion members 23 and 25.

The assemblage of the germanium-silicon body 10, tungsten bodies 22 and 24, and the differential expansion clamp 70 holding them is heated in a vacuum furnace (not shown) at a temperature of about 1000° C. for about 30 minutes. The residual atmospheric pressure within the furnace is maintained at about $1\times10^{-4}$ torr. During this heating step, the two stainless steel members 23 and 25 expand, and thereby increase the pressure between the two tungsten bodies 22 and 24. Pressures as high as 200 pounds per square inch and higher are thus easily attained.

The assemblage is permitted to cool to room temperature while in the furnace, and then removed. When the tungsten-semiconductor-tungsten sandwich is removed from the expansion clamp 70, it is found that the components of the sandwich have been firmly bonded together. The bond between each tungsten body 22 and 24 and the germanium-silicon body 10 is mechanically strong, exhibits low electrical resistivity, low thermal resistivity, and is stable over prolonged periods of time despite repeated cycling in vacuum to temperatures as high as 750° C.

*Example III*

The method of the invention may also be utilized to fabricate thermoelectric devices, as described in the following example.

Thermoelectric devices for converting heat energy directly into electrical energy by means of the Seebeck effect generally comprise two thermoelectric bodies as the thermoelectric circuit members or components. The two thermoelectric bodies, also known as thermoelements, are bonded at one end to a block of metal so as to form a thermoelectric junction. The two thermoelectric bodies are of opposite thermoelectric types, that is, one thermoelement is made of P-type thermoelectric material, and the other of N-type thermoelectric material. Which thermoelectric material is N-type and which P-type determines the direction of current flow across the cold junction of a thermocouple formed between the thermoelectric material in question and a metal such as lead, when the thermocouple is operating as a thermoelectric generator according to the Seebeck effect. If the current direction in the external circuit is positive toward the thermoelectric material, then the material is "P-type"; if the current direction in the external circuit is negative toward the thermoelectric material, then the material is "N-type." The present invention relates to both P-type and N-type germanium-silicon materials generally.

The two thermoelectric bodies should have a low electrical resistivity, since the Seebeck EMF generated in a device of this type is dependent upon the temperature difference between the hot and cold junctions of the device. The generation of Joulean heat in a thermoelectric device due to the electrical resistance of either thermoelement, or due to the resistance of the electrical contacts on either thermoelement, reduces the efficiency of the device. The resistance of contacts on thermoelements is desirably as low as may be in both Seebeck (power generating) and Peltier (refrigerating) thermoelectric devices. For example, high resistance contacts may reduce the cooling effect of Peltier devices as much as 40% below the theoretical maximum value.

Figure 8:
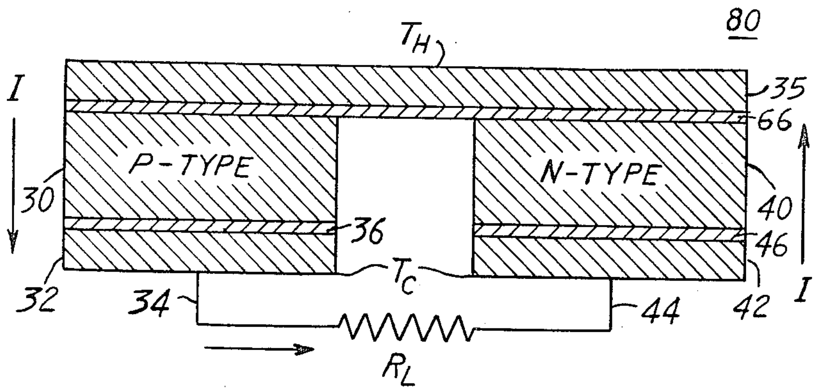

Referring to FIGURE 8, the thermoelectric device 80 for the direct conversion of thermal energy to electrical energy by means of the Seebeck effect comprises a P-type thermoelectric body or thermoelement 30, and an N-type thermoelectric body or thermoelement 40. The two thermoelements 30 and 40 are conductively bonded at one end of each thermoelement by means of a metal plate 35. The other end of each of the thermoelements 30 and 40 is bonded to electrical contacts 32 and 42 respectively. Contacts 32 and 42 are preferably metallic blocks or bodies to which electrical lead wires 34 and 44 respectively may be readily attached. For high efficiency in the conversion of thermal energy to electrical energy by means of the Seebeck effect, the electrical resistance between each thermoelement (30 and 40) and metal plate 35, as well as the electrical resistance between each thermoelement and its respective contact block (32 and 42), should be minimized.

In the operation of device 80, the metal plate 35 and its junctions to the thermoelements 30 and 40 is heated to a temperature $T_H$, and becomes the hot junction of the device. The metal contacts 32 and 42 on thermoelements 30 and 40 respectively are maintained at a temperature $T_C$ which is lower than the temperature $T_H$ of the hot junction of the device. The lower or cold junction temperature $T_C$ may, for example, be at room temperature. A temperature gradient is thus established in each of thermoelements 30 and 40 from a high temperature $T_H$ adjacent plate 35 to a lower temperature $T_C$ adjacent contacts 32 and 42 respectively. The electromotive force developed under these conditions produces in the external circuit a flow of (conventional) electrical current (I) in the direction shown by arrows in FIGURE 8; that is, the current flows in the external circuit from the P-type element 30 toward the N-type thermoelement 40. The device is utilized by connecting a load $R_L$, shown as a resistance 37 in the drawing, between the lead wires 34 and 44 which are attached to contacts 32 and 42 of thermoelements 30 and 40 respectively.

The thermoelectric bodies or thermoelements 30 and 40 advantageously each consist of a germanium-silicon alloy containing 1 to 50 atomic percent germanium, balance silicon. In this example, both of the two thermoelectric bodies 30 and 40 consist of polycrystalline germanium-silicon alloys containing 25 atomic percent germanium, balance silicon. Thermoelement 30 contains an excess of acceptor impurities (such as boron, aluminum, and gallium) so as to be P-type, while thermoelement 40 contains an excess of donors (such as phosphorus, arsenic, and antimony) and hence is N-type. The metal plate 35 and the two metal bodies 32 and 42 which are bonded to thermoelements 30 and 40 respectively and serve as low resistance contacts thereto, are all made of tungsten in this example.

The tungsten plate 35 and the tungsten contact blocks 32 and 34 are bonded to the germanium-silicon thermoelements 30 and 40 by means of a tungsten carbide layer on that face of each tungsten body which is adjacent the germanium-silicon thermoelements. In this example, the tungsten plate 35 is provided with a tungsten carbide layer 66 on one face by any convenient method, such as that described in Example I above. The tungsten contact blocks 32 and 42 are similarly provided on one face with tungsten carbide layers 36 and 46 respectively. If desired, the tungsten contacts 32 and 42 may first be bonded to one end of the thermoelements 30 and 40 respectively in the manner described in Example I above, and then the other end of the thermoelements 30 and 40 bonded to plate 35 in a second and subsequent operation. Alternatively the plate 35, thermoelements 30 and 40, and contact blocks 32 and 42 may all be positioned in a jig or clamp in a manner similar to that described in Example II above, and the entire assemblage then heated in a vacuum furnace or other non-oxidizing ambient so as to bond the tungsten bodies (32, 35 and 42) to the germanium-silicon bodies (30 and 40) in a single operation.

As described above, the precise nature of the bond between the germanium-silicon thermoelements (30 and 40) and the tungsten bodies (32, 35 and 42) in device 80 is not certain. Although it is presently believed that a tungsten silicide layer is formed at the contact interface, both tungsten monosilicide and tungsten disilicide may be present.

The Seebeck device 80 thus fabricated combines a number of important advantages. First, the thermoelectric device 80 can be operated at elevated temperatures. In the prior art, a solder was used to bond the thermoelements 30 and 40 to metal plate 35 and metal contacts 32 and 42. The melting point of the solder was lower than the temperatures which the bond in the device of FIGURE 8 withstands. Therefore, the device of FIGURE 8 may be operated at higher temperatures than prior art devices. A thermoelectric device may be regarded as a heat engine, and hence for a high Carnot efficiency requires a large temperature difference between the hot and cold junctions. Since the cold junction is generally at room temperature, the hot junction temperature $T_H$ should be as high as possible for maximum efficiency. In the device 80 of this example, the tungsten bodies utilized as contacts can withstand elevated temperatures. Hence the only limitation on the hot junction temperature $T_H$ for the device 80 is that imposed by the germanium-silicon alloy itself.

Second, the bonds or joints between the germanium-silicon bodies 30 and 40 and the tungsten bodies 32, 35 and 42 are mechanically very strong. A bond thus formed was not broken when shock tested under accelerations of 100 gravities. It is believed that one of the factors which induces mechanically strong bonds in the device 80 is the good match between the thermal coefficient of expansion of the germanium-silicon body and that of the tungsten bodies.

Third, the electrical resistance between the germanium-silicon bodies or thermoelements 30 and 40 and the tungsten bodies 32, 35 and 42 of the device 80 is very low. The interphase resistance between such thermoelements and their tungsten contacts has been found so low as to be negligible, and is typically only about 20 micro-ohms per $cm.^2$. As discussed above, such low resistance is very important for optimizing the efficiency of the device.

Fourth, the bonds or joints between the germanium-silicon bodies 30 and 40 and the tungsten bodies 32, 35 and 42 in thermoelectric device 80 are thermostable. Thermoelectric devices, such as the Seebeck device 80 of Example III, can be utilized in a non-oxidizing ambient for prolonged periods at elevated temperatures, or can be repeatedly cycled to elevated temperatures, without weakening the bonds.

Fifth, the thermal resistance of the bonds or joints between the germanium-silicon bodies 30 and 40 and the tungsten bodies 32, 35 and 42 of the device 80 is low. This feature of high thermal conductivity (low thermal resistivity) across the bond interface is desirable for optimization of the efficiency of thermoelectric devices.

It will be understood that the various embodiments described above are by way of example only, and not limitation. Other jigs or clamps may be utilized to press together a germanium-silicon body and a tungsten body having a tungsten carbide layer on the face adjacent the germanium-silicon body. While in the device described in Example III both the P-type and the N-type thermoelements consisted of germanium-silicon alloy, it will be understood that a thermoelectric device may be fabricated in which only one thermoelement consists of a given type germanium-silicon alloy having a tungsten contact block bonded thereto by means of a tungsten carbide layer on one face of the tungsten block, while the other thermoelement consists of a different thermoelectric material of opposite type. Various other modifications may be made without departing from the spirit and scope of the invention as described in the specification and appended claims.

What is claimed is:

1. The method of bonding a germanium-silicon alloy body to a tungsten body, comprising the steps of:
forming a tungsten carbide layer on at least one face of said tungsten body;
contacting said germanium-silicon alloy body and said tungsten carbide face of said tungsten body; and,
heating the contacted bodies in a non-oxidizing ambient to a temperature sufficient to cause a reaction between said bodies while applying pressure between them.

2. The method of bonding a germanium-silicon alloy body to a tungsten body, comprising the steps of:
forming a tungsten carbide layer on at least one face of said tungsten body;
contacting said germanium-silicon alloy body and said tungsten carbide face of said tungsten body; and,
heating the assemblage of said bodies in a non-oxidizing ambient while applying pressure between them, the temperature and pressure during said heating step being sufficient to form a mechanically strong bond between said bodies.

3. The method of bonding a germanium-silicon alloy body to a tungsten body, comprising the steps of:
forming a tungsten carbide layer on at least one face of said tungsten body;
contacting said germanium-silicon alloy body and said tungsten carbide face of said tungsten body; and,
heating the assemblage of said bodies in an inert gas while applying pressure between them, the temperature and pressure during said heating step being sufficient to form a mechanically strong bond between said bodies.

4. The method of bonding a germanium-silicon alloy body to a tungsten body, comprising the steps of:
forming a tungsten carbide layer on at least one face of said tungsten body;
contacting said germanium-silicon alloy body and said tungsten carbide face of said tungsten body; and,
heating the assemblage of said bodies in a reducing ambient while applying pressure between them, the temperature and pressure during said heating step being sufficient to form a mechanically strong bond between said bodies.

5. The method of bonding a germanium-silicon alloy body to a tungsten body, comprising the steps of:
forming a tungsten carbide layer on at least one face of said tungsten body;
contacting said germanium-silicon alloy body and said tungsten carbide face of said tungsten body; and,
heating the assemblage of said bodies in a vacuum at a residual pressure less than $1 \times 10^{-3}$ torr while applying pressure between them, the temperature and pressure during said heating being sufficient to form a mechanically strong bond between said bodies.

6. The method of bonding a germanium-silicon alloy body to a tungsten body, comprising the steps of:

forming a tungsten carbide layer about ½ to 5 mils thick on at least one face of said tungsten body;

contacting said germanium-silicon alloy body and said tungsten carbide face of said tungsten body; and, heating the assemblage of said bodies in a non-oxidizing ambient while applying pressure between them.

7. The method of bonding a tungsten body to a body of germanium-silicon alloy containing 1 to 50 atomic percent germanium, comprising the steps of:

forming a tungsten carbide layer on at least one face of said tungsten body;

applying a pressure of between about 1 to 200 pounds per square inch between said germanium-silicon body and said tungsten carbide face of said tungsten body; and, heating said bodies in a non-oxidizing ambient to a temperature of about 1100° to 1250° C. while maintaining said pressure between said bodies.

8. The method as in claim 7, in which said tungsten carbide layer is about ½ to 5 mils thick.

9. The method as in claim 8, in which said non-oxidizing ambient is an inert gas.

10. The method as in claim 8, in which said non-oxidizing ambient is a vacuum at a residual pressure less than $1 \times 10^{-3}$ torr.

11. The method of bonding a tungsten body to a body of germanium-silicon alloy containing 1 to 50 atomic percent germanium, comprising the steps of:

covering one face of said tungsten body with carbon and heating said tungsten body in a reducing ambient at a temperature high enough to form a tungsten carbide layer on said one face of said tungsten body;

contacting said germanium-silicon body and said tungsten carbide face of said tungsten body;

applying a pressure of about 1 to 200 pounds per square inch between said contacted germanium-silicon body and said tungsten body; and, heating the assemblage of said bodies in a non-oxidizing ambient to a temperature of about 1100° to 1250° C. while maintaining said pressure between said bodies.

12. The method of bonding a tungsten body to a body of germanium-silicon alloy containing 1 to 50 atomic percent germanium, comprising the steps of:

covering one face of a tungsten body with carbon and heating said tungsten body in a reducing ambient at a temperature high enough to form a tungsten carbide layer on said one face of said tungsten body, some of said carbon remaining unreacted;

removing said unreacted carbon;

contacting said germanium-silicon alloy body and said tungsten carbide face of said tungsten body;

applying a moderate pressure between said contacted germanium-silicon body and said tungsten body; and, heating the contacted said bodies in a non-oxidizing ambient to a temperature of about 1100° to 1250° C. while maintaining said pressure between said bodies.

13. The method of bonding a tungsten body to a body of germanium-silicon alloy containing 1 to 50 atomic percent germanium, comprising the steps of:

covering one face of said tungsten body with carbon and heating said tungsten body in a reducing ambient at a temperature high enough to form a tungsten carbide layer on said one face, some of said carbon remaining unreacted;

removing said unreacted carbon;

depositing on said tungsten carbide layer a film comprising finely divided silicon;

contacting said germanium-silicon alloy body and said tungsten carbide face of said tungsten body;

applying a moderate pressure between said contacted germanium-silicon alloy body and said tungsten body; and, heating the contacted said bodies in a non-oxidizing ambient while maintaining said pressure between them, the temperature and pressure during said step being sufficient to form a mechanically strong bond between said bodies.

14. The method of bonding a tungsten body to a body of germanium-silicon alloy containing 1 to 50 atomic percent germanium, comprising the steps of:

covering one face of said tungsten body with carbon and heating said tungsten body in a reducing ambient at a temperature high enough to form a tungsten carbide layer on said one face, some of said carbon remaining unreacted;

removing said unreacted carbon;

depositing on said tungsten carbide layer a film comprising finely divided silicon;

heating said tungsten body in vacuum at about 1500° C. to 1750° C. for about 10 to 60 minutes;

applying a moderate pressure between said germanium-silicon body and said tungsten carbide face of said tungsten body; and, heating the assemblage of said bodies in a non-oxidizing ambient to a temperature of about 1100° to 1250° C. while maintaining said pressure between said bodies.

15. The method of bonding a tungsten body to a body of germanium-silicon alloy containing 1 to 50 atomic percent germanium, comprising the steps of:

covering one face of said tungsten body with carbon and heating said tungsten body in a reducing ambient at a temperature high enough to form a tungsten carbide layer about ½ to 5 mils thick on said face of said tungsten body; some of said carbon remaining unreacted;

removing said unreacted carbon;

painting said tungsten carbide layer with a suspension comprising finely divided doped silicon;

thereafter heating said tungsten body in vacuum at about 1500° to 1750° C. for about 10 to 60 minutes;

applying a moderate pressure between said germanium-silicon body and said tungsten carbide face of said tungsten body; and, heating the assemblage of said bodies in a non-oxidizing ambient to a temperature of about 1100° to 1250° C. while maintaining said pressure between said bodies.

16. A device comprising at least one germanium-silicon alloy body and at least one tungsten body bonded to said germanium-silicon body, said tungsten body having a layer of tungsten carbide on the surface adjacent said germanium-silicon body.

17. A device comprising at least one germanium-silicon alloy body consisting essentially of one to fifty atomic percent germanium, balance silicon, and at least one tungsten body bonded to said germanium-silicon body, said tungsten body having a layer of tungsten carbide on the surface adjacent said germanium-silicon body.

18. A device comprising at least one germanium-silicon alloy body and at least one tungsten body bonded to said germanium-silicon body, said tungsten body having a layer of tungsten carbide about ½ to 5 mils thick on the surface adjacent said germanium-silicon body.

19. A device comprising a germanium-silicon alloy body joined to a tungsten body, the joint between said bodies comprising, in order between said alloy body and said tungsten body:

a zone comprising germanium-enriched germanium-silicon alloy;

a zone comprising a mixture of silicon carbide and tungsten silicides; and a zone of tungsten carbide.

20. The method of bonding a germanium-silicon alloy body to a tungsten body, comprising the steps of:

forming a tungsten carbide layer on at least one face of said tungsten body;

applying a layer of silicon on said tungsten carbide layer;

contacting said germanium-silicon alloy body and said silicon covered tungsten carbide face of said tungsten body; and heating the contacted bodies in a non-oxidizing ambient to a temperature sufficient to cause a reaction between said bodies while applying pressure between them.

References Cited

UNITED STATES PATENTS

| | | | |
|---|---|---|---|
| 2,778,757 | 1/1957 | Wellborn | 148—13.1 X |
| 2,971,251 | 2/1961 | Willemse | 29—195 |
| 3,059,329 | 10/1962 | Gerlach | 29—195 X |
| 3,129,070 | 4/1964 | Westbrook et al. | 29—195 |
| 3,197,858 | 8/1965 | Feduska et al. | 29—494 |
| 3,235,957 | 2/1966 | Horsting | 29—472.3 |

ALFRED L. LEAVITT, *Primary Examiner.*

RALPH S. KENDALL, *Examiner.*